July 9, 1968  A. MAMO  3,391,555

LOCKING DEVICE FOR A TRAILER HITCH

Filed Dec. 20, 1967

INVENTOR.
ANTHONY MAMO
BY

United States Patent Office 3,391,555
Patented July 9, 1968

3,391,555
LOCKING DEVICE FOR A TRAILER HITCH
Anthony Mamo, 9740 SW. 72nd St.,
South Miami, Fla. 33143
Filed Dec. 20, 1967, Ser. No. 692,192
5 Claims. (Cl. 70—258)

ABSTRACT OF THE DISCLOSURE

A device for locking the coupled hitch of a boat or other trailer to a vehicle requiring the use of a cylinder lock key for uncoupling same.

This invention relates in general to locking means for securing the hitch of a conventional vehicle trailer in normal hitched position and requiring the use of a lock key for unhitching the trailer from the vehicle.

Common link chain or cable and padlock are commonly used for locking a trailer to a vehicle, which are easily defeated by forcing the lock or breaking the chain which is well known common procedure in the theft of the trailer or the vehicle.

The present invention overcomes the above objections and disadvantages by the provision of a locking device fitted over the conventional joint of the hitch and secured thereto by the action of a cylinder lock therein without limiting the normal movement required by the hitch when the vehicle is hauling the trailer.

A principal object of the invention is the provision of a device straddling a conventional hitch and supplied with a master under bolt for securing the hitched in engaged position without limiting the normal movement thereof and provided with a cylinder lock in the bolt for preventing the removal of the latter without the key thereof.

These and other objects and advantages in one embodiment of the invention are described and shown in the following specification and drawing, in which.

Figure 1:
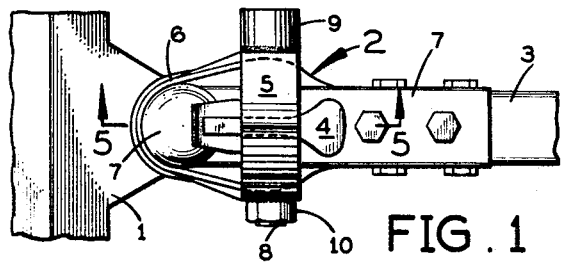
FIG. 1 is a top plan view of a locking device secured to a typical trailer hitch in reduced scale.
Figure 2:
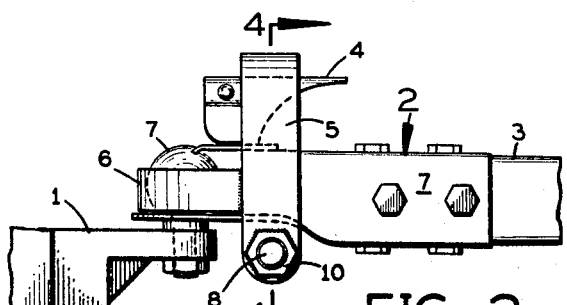
FIG. 2 is a side elevation of the device shown in FIG. 1.

Referring to FIGS. 1 and 2, a conventional vehicle traction member 1, is secured to the rear of the vehicle and normally supports a well known quick detachable ball-socket hitch assembly 2, which is secured to draw bar 3 of the trailer. It is well known that the ball-socket type of hitch provides adequate universal movement to accommodate variations in the levels of the vehicle and trailer when encountering uneven or non-planar paths of travel.

The hitch is normally secured in engaged position by an over-center pivoted lever 4, shown in normal position. The locking device is shown in FIGS. 1 and 2 in locked position and without impeding the normal movement of the hitch with a housing or saddle member 5 straddling the hitch directly over the lever 4. The saddle member has welded thereto an angular shaped forward member 6 which surrounds the forward portion of the ball socket member 7 of the hitch assembly. A special bolt 8 is positioned transversely through the lower ends of saddle member 5 and under the hitch member, as shown, with the head thereof retained within a guard collar 9 by a nut 10 with one side thereof securely welded to one leg of the saddle 5, better shown in FIG. 4.

Figure 4:
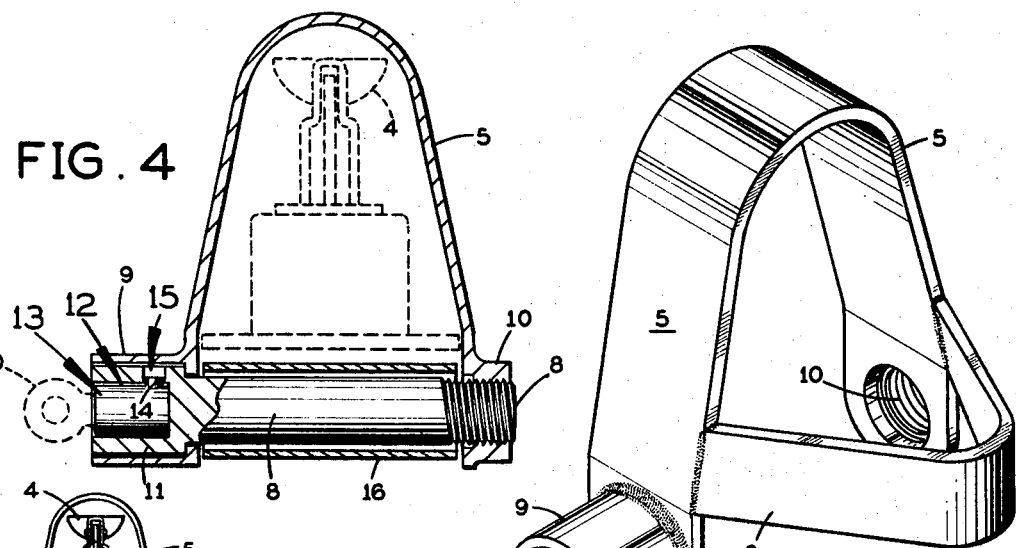
FIG. 4 is an enlarged cross sectional view taken through section line 4—4, FIG. 2.
Figure 3:
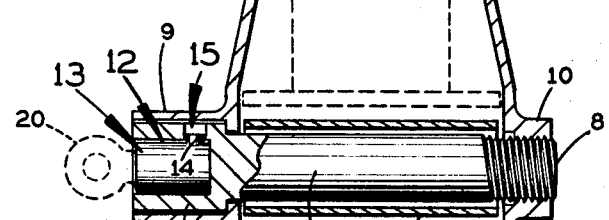
FIG. 3 is a front end elevation of the device shown in FIG. 1.
Figure 6:
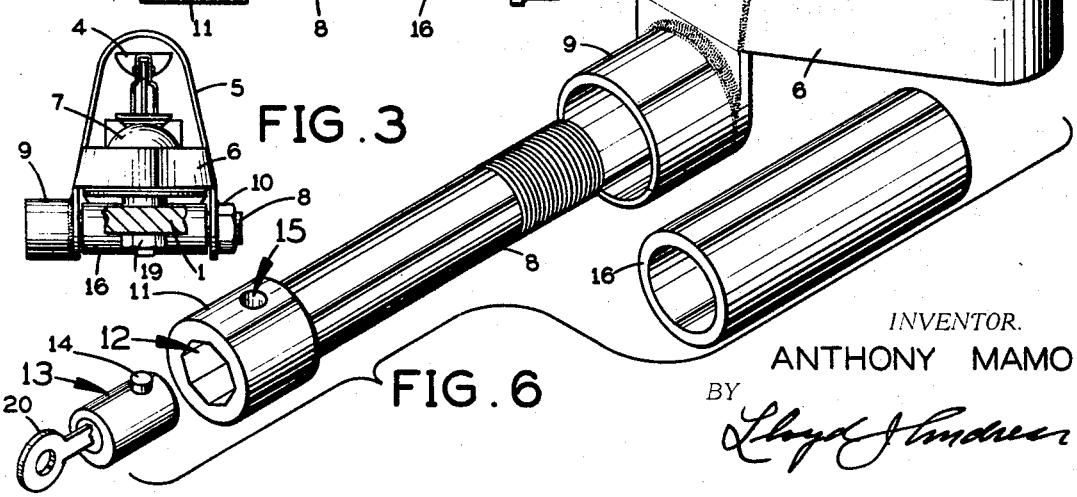
FIG. 6 is an enlarged exploded view of the elements of the locking device.

Referring to FIG. 4, the outer end of the bolt 8 is threaded into mating engagement with the threads in nut 10. The bolt head 11 has a coaxial hexagonal socket 12 therein for slidably retaining a cylinder tumbler lock assembly 13, which assembly includes a slidable lock plunger 14 positioned to engage a transverse hole 15 through the wall of the bolt head 11. A sleeve 16 is loosely retained around the body of bolt 8 between the lower legs of the saddle member 5, as shown.

Figure 5:
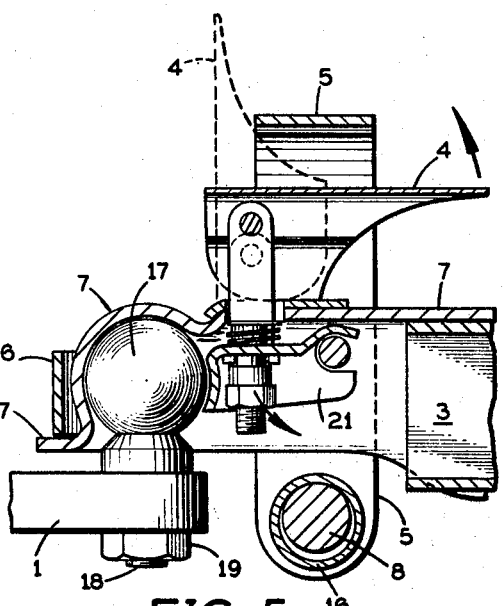
FIG. 5 is an enlarged cross sectional view taken through section line 5—5, FIG. 1.

Referring to FIG. 5, the main socket member 7 of the hitch assembly is secured to the draw bar 3 by well known fasteners, shown in FIGS. 1 and 2, and engages traction ball 17 normally held in engaged position by a rear retaining member 21, as shown in full lines, which responds to lever 4, when the lever is in normal position. When the lever 4 is moved to the dotted position, as shown, the member 21 will retract to a position in the direction of the arrow and permit the disengagement of socket 7 from ball 17.

The ball 17 is normally secured to traction bar 1 by an integral shoulder and threaded stud 18 retained by a nut 19.

In operation and when the ball 17 and socket member 7 are in normal engagement, as illustrated in FIG. 5, then the saddle member 5 is positioned over the lever 4 and the angular member 6 around the socket member 7, as shown in FIGS. 1 and 2. Then with the sleeve 16 positioned coaxial with collar 9 and nut 10, the bolt is inserted and threaded into the nut 10, as shown in FIG. 4, by the use of a conventional Allen wrench. Then the lock assembly 13, with its key 20 inserted therein and the plunger 14 retracted, is inserted in the socket 12 and rotated until the plunger 14 aligns with and is moved into hole 15, and the key 20 withdrawn from the lock.

It is now apparent that the release lever 4 cannot be raised and any effort to remove the bolt 8 to release the hitch assembly by means of rotating the bolt by wrench means is defeated by the free rotary movement of sleeve 16. Since the hole 15 is completely covered by collar 9, any attempt to depress the plunger 14 and unlock the cylinder is also defeated.

It is to be noted that the shoulder and stud 18 and the nut 19 of the ball 17 may be welded to the traction bar for added security.

It is apparent that steel is a preferred material to be used in the manufacture of the aforesaid element, particularly when case hardened, which will defeat most entry attacks.

It is also to be noted that a spare ball 17 may be locked in the hitch when the latter is detached from the vehicle to prevent the unlicensed transfer of the hitch to a traction ball of another vehicle.

It is understood that certain modifications in the above construction, utilizing the features described, are intended to come within the scope of the appended claims.

Having described my invention, I claim:

1. A locking device for preventing the operation of the release member of a trailer hitch for uncoupling a trailer from a vehicle comprising a saddle member straddled over said release member and said hitch and having each opposite side thereof extending a predetermined distance below said hitch,
   one said side below said hitch having a lock bolt bore therethrough and the said opposite side having a coaxial threaded bore therein and an integral bolt head housing extending outward from said bolt bore side with a cylindrical bore therein coaxial with and of larger diameter than said bolt bore,
   a lock bolt having a cylindrical head at one end and threaded at the oposite end thereof extending through said bolt bore and threaded into said threaded bore transversely under said hitch with said head within said cylindrical bore for holding said member on said hitch, said bolt head having a coaxial keyed cavity therein for slidably receiving a wrench means for manually rotating said bolt including a transverse hole entering said cavity for receiving a lock plunger, a cylinder lock removably positioned in said keyed cavity including a retractable transverse plunger for engaging and disengaging said hole when operated by a key whereby said lock when locked in said keyed bore will prevent the insertion of said wrench when the end of said bolt is threaded into said threaded bore for preventing the operation of said release member and the uncoupling of said hitch, 2. The construction recited in claim 1 including a sleeve loosely retained around said bolt between each of said sides of said saddle for preventing the manual rotation of said bolt by manual tool means and simultaneously shearing said plunger.

3. A locking device for a vehicle trailer hitch comprising a latch means operatively associated with said hitch for movement from a locked to an unlocked position for uncoupling said hitch, a rigid member adapted and constructed to be positioned over and around said hitch with the opposite sides thereof extending a predetermined distance below said hitch, a threaded bolt having a cylindrical head positioned through each of said sides and transversely under said hitch and threaded into said member for holding said rigid member on said hitch, a bolt head guard member integral with one of said sides having an open core therein coaxial with said bolt for retaining the said head of said bolt therein, said bolt head having a coaxial keyed cavity therein for slidably receiving a wrench means for rotating said bolt including a transverse hole entering said cavity for receiving a lock plunger, a cylinder lock slidably and removably positioned in said keyed cavity including a retractable transverse plunger for engaging and disengaging said hole when operated by a key whereby said lock when locked in said keyed bore will prevent the insertion of said wrench when the end of said bolt is threaded into said threaded bore for preventing the movement of said latch means to said unlocked position to uncouple said hitch.

4. In a locking device for a trailer hitch for the character described means forming a housing adapted and constructed to cover predetermined portions of said hitch and to extend below same at opposite sides thereof, threaded lock bolt having a cylindrical head, said bolt adapted to be positioned below said hitch and extending through a lower portion of each of said sides of said housing by thread means therein for holding said hitch in normal coupled position, the side surface of said head covered in close proximity therewith by the inner surface of a bore coaxial with said head in an integral extension of said housing, said head having a cavity in the end thereof keyed to receive a wrench means for rotating the said bolt for removing and replacing same, a key lock means removably positioned and adapted and constructed for locking engagement in said cavity for the prevention of the use of said wrench means.

5. The construction recited in claim 4 including a sleeve loosely positioned around said bolt and extending between each of said opposite sides of said housing.

References Cited

UNITED STATES PATENTS

| | | | |
|---|---|---|---|
| 2,671,675 | 3/1954 | Swaisgood | 280—507 |
| 3,139,291 | 6/1964 | Geresy | 280—507 |
| 3,296,842 | 1/1967 | Auerbach et al. | 70—82 |

MARVIN A. CHAMPION, *Primary Examiner.*

R. L. WOLFE, *Assistant Examiner.*